Aug. 28, 1934.  V. C. NORQUIST  1,972,029
WELDING APPARATUS
Filed Nov. 11, 1931  4 Sheets-Sheet 1
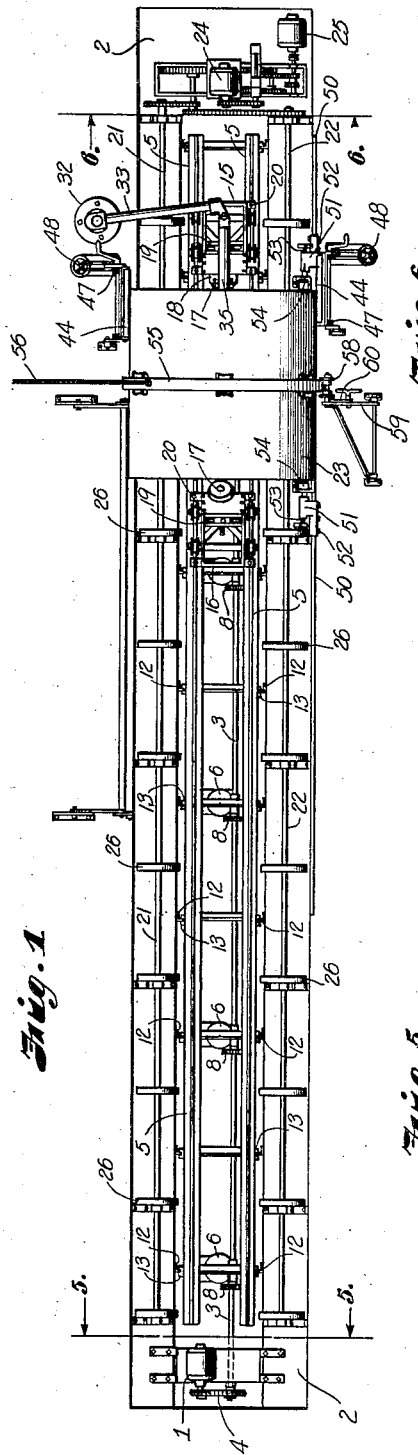
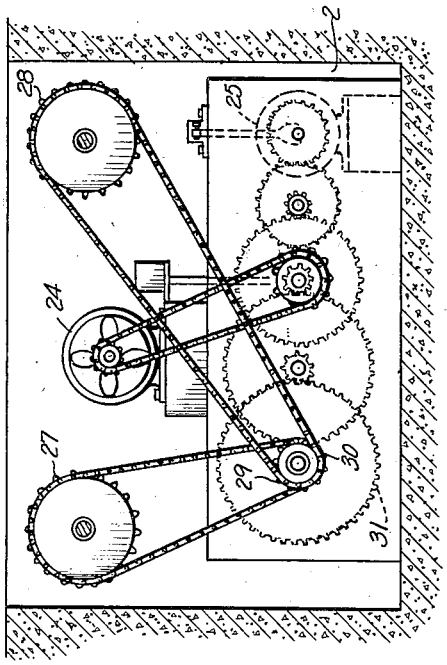
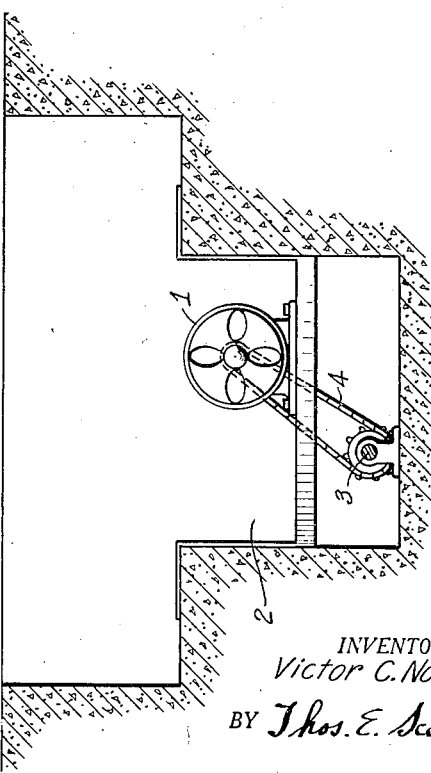
INVENTOR.
Victor C. Norquist
BY Thos. E. Scofield
ATTORNEY.

Aug. 28, 1934.   V. C. NORQUIST   1,972,029
WELDING APPARATUS
Filed Nov. 11, 1931   4 Sheets-Sheet 2

INVENTOR.
Victor C. Norquist
BY Thos. E. Scofield
ATTORNEY.

Aug. 28, 1934.   V. C. NORQUIST   1,972,029
WELDING APPARATUS
Filed Nov. 11, 1931   4 Sheets-Sheet 4

INVENTOR.
Victor C. Norquist
BY Thos. E. Scofield
ATTORNEY.

Patented Aug. 28, 1934

1,972,029

UNITED STATES PATENT OFFICE 1,972,029

WELDING APPARATUS

Victor C. Norquist, Kansas City, Mo., assignor to Butler Manufacturing Company, Kansas City, Mo., a corporation of Missouri Application November 11, 1931, Serial No. 574,321

4 Claims. (Cl. 219—6)

My invention relates to a welding method and an apparatus to be used in connection therewith.

In welding large tanks, the method at present is to form a number of rings by welding a series of plates together. The rings are supported internally, to give them a required stiffness and to enable them to retain a circular shape, by spiders. A pair of rings is placed in juxtaposition and spot-welded to hold them in place. The rings thus joined are then welded by hand, the cylinder being rolled along the floor or on rollers during the welding process. It will be appreciated that this is a laborious and time consuming method. The weld must be made in a series of short arcs and will be more or less uneven and rough.

One object of my invention is to provide a process whereby large tanks may be automatically welded.

A further object of my invention is to provide an automatic means of welding tanks at a speed several times that of hand welding and to produce thereby a uniform ductile weld.

Another object of my invention is to provide a means for holding the sections of a tank in welding position, rotating them while thus held and welding while rotating.

Still another object of my invention is to provide an assembly for handling tank sections expeditiously and for placing them in welding position.

Another object of my invention is to provide an assembly in which a novel clamp may be used in order to produce a weld having an exterior smooth surface.

Further objects will appear from the following description.

In the accompanying drawings:

Figure 1 is a plan of the assembly embodying one mode of carrying out my invention.

Figure 5 is a section taken on the line 5—5 of Figure 1.

Figure 6 is a section taken on the line 6—6 of Figure 1.

Figure 7 is a detail view showing an elevation of a modified form of my clamp for use in making an outside weld.

Figure 8 is an enlarged detail view of a portion of the clamp shown in Figure 7.

Figure 9 is a section taken on the line 9—9 of Figure 7.

Figure 2:
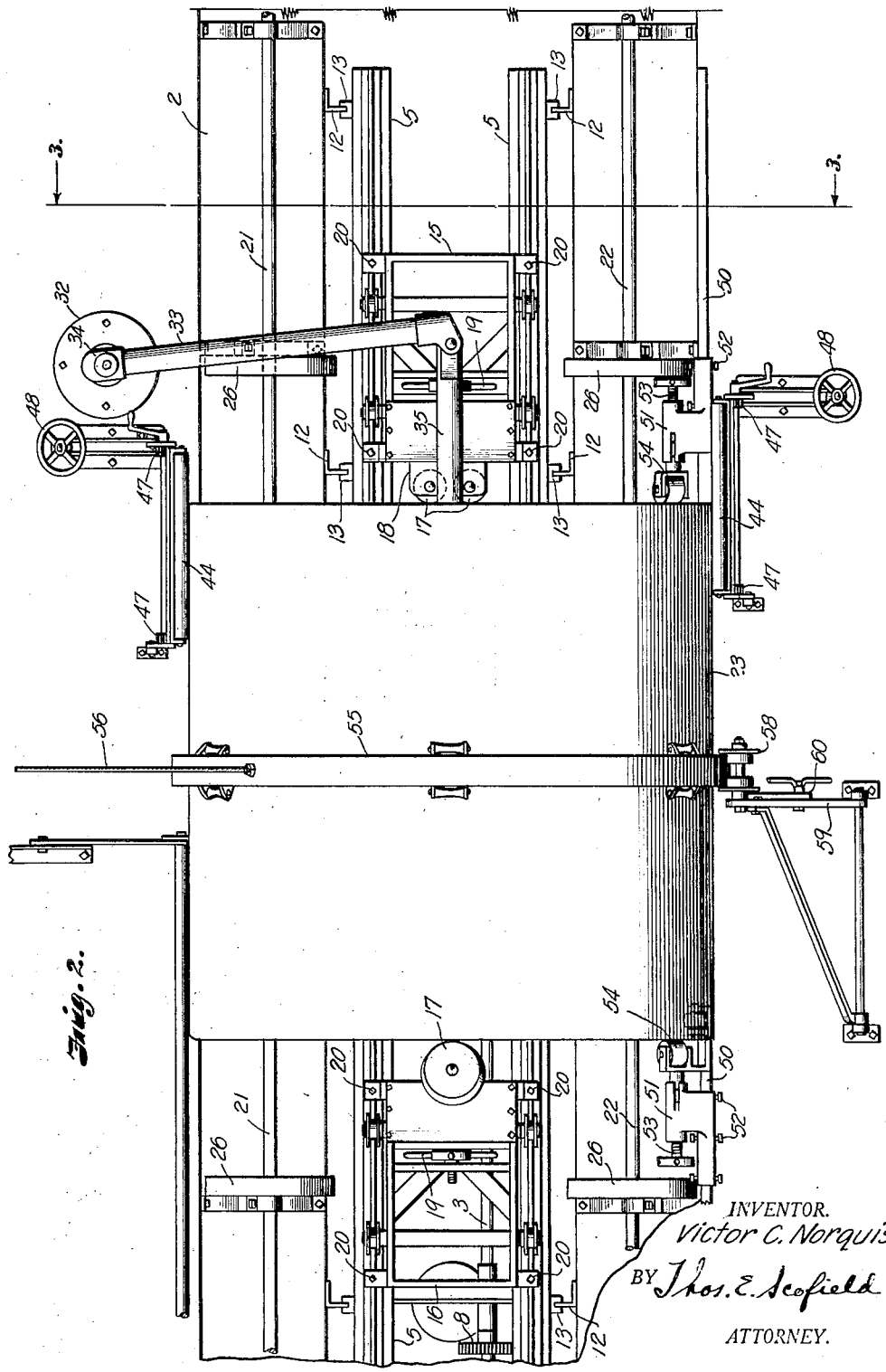
Figure 2 is an enlarged plan view of a portion of the assembly shown in Figure 1.

In general, my invention contemplates the forming of tank rings or sections as usual by welding a series of plates together to form a cylindrical ring. Spiders made of curved pipes welded together and having suitable spokes are placed within the rings to give them sufficient stiffness to be handled and to retain them in circular shape. I provide a pit in which is placed a track. Means are provided for raising and lowering the track. The tank rings are placed on carriages which run along the track. At one end of the pit I provide a support for my novel clamp. Two sections of the tank are placed upon carriages and run along the track to welding position so that the clamp is adjacent their meeting periphery. The track is then lowered permitting the two sections and the clamp to rest upon rollers which are provided at each side of the pit. These rollers are placed at frequent intervals and act to support the tank sections. Clamping carriages are disposed on the track on both sides of the clamp. These carriages are then run to abutting position with the rings and then clamped to the track. Rollers are provided on the carriages adapted to be moved by screw jacks. Pressure is then exerted by the screw jacks through the rollers to urge the two tank sections together. Then the peripheral clamp is actuated to hold the sections in welding position. On one side of the pit is a pedestal which supports a universal automatic arc welding device. By automatic arc welding device, I mean a device which will feed a welding rod at a uniform rate of speed. This device will be hereinafter referred to as the rod feeding mechanism. The rollers upon which the tank sections now rest are keyed to shafts. These shafts are rotatable at various speeds to enable the tank sections to be rotated. The operator is positioned within the tank if an inside weld is to be used and on top of the tank if an outside weld is to be used in order that overhead welding be avoided. An operator's seat may be provided upon the universal support if desired. The operator brings the rod feeding mechanism to position over the seam, energizes the tank rotating motor and begins welding. The tank sections will then be rotated at a uniform speed which may be varied by the operator, if desired, within certain limits. The welding then progresses until the entire periphery is welded. It is manifest that a uniform and ductile weld will be produced at a speed several times that of hand welding.

After adjoining sections have been welded, the track is again raised and the carriages will support the tank section. A new ring is placed upon another carriage and abutted against the tank section and the abutting periphery is moved to welding position and the process repeated.

In the drawings, like reference numerals will be used to indicate like parts in the several views.

Figure 3:
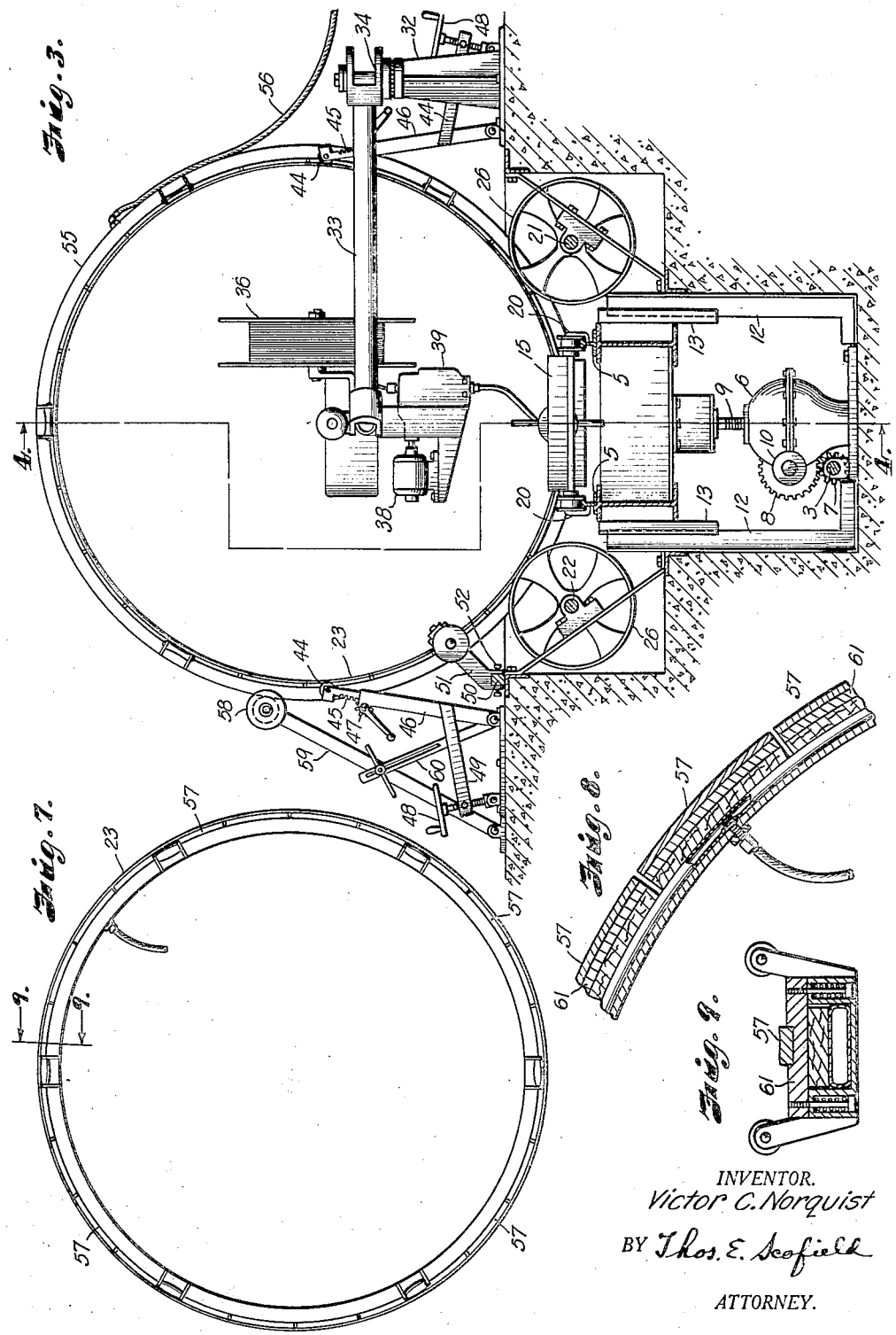
Figure 3 is a sectional view of a section taken on line 3—3 of Figure 2.
Figure 4:
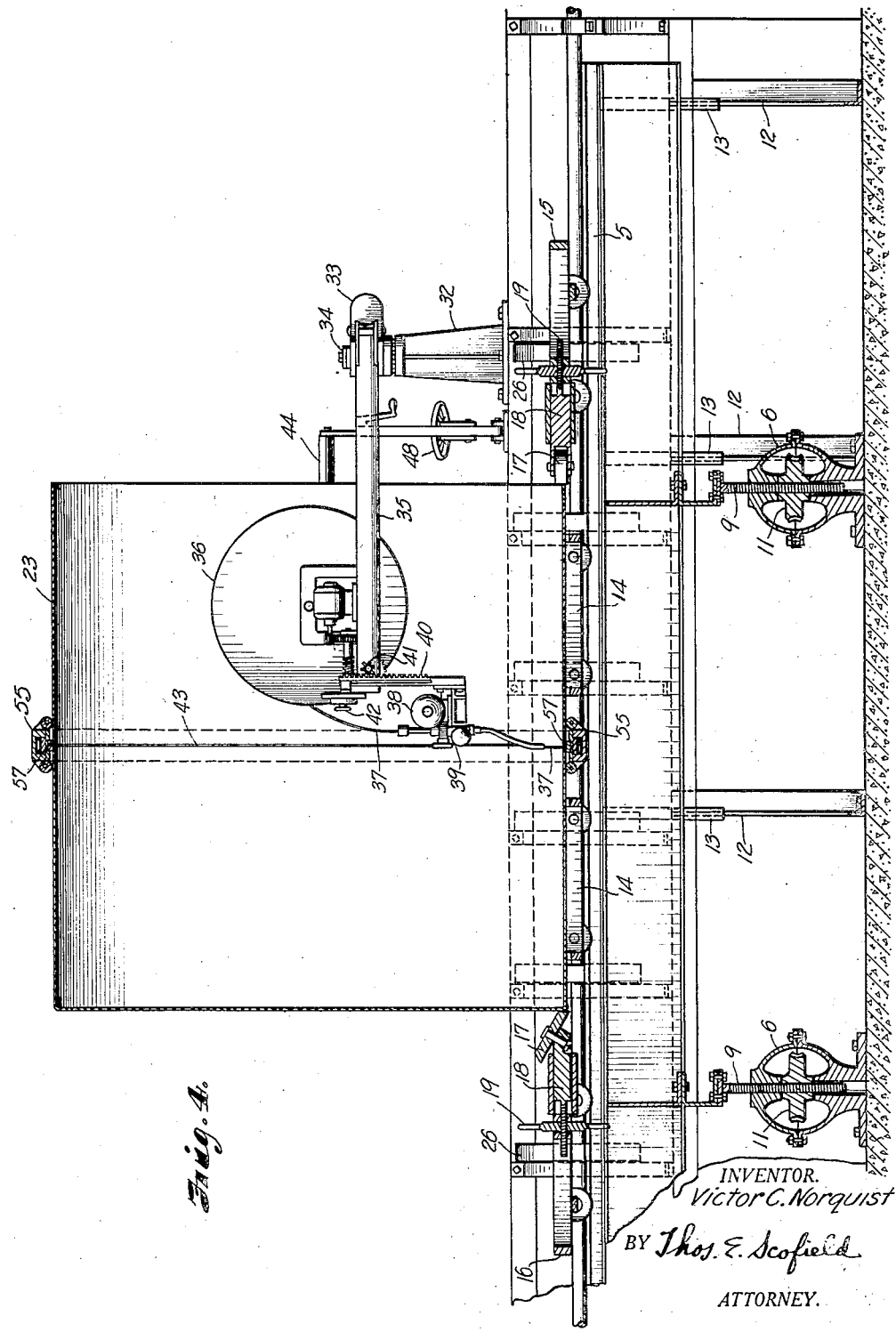
Figure 4 is a section taken on the line 4—4 of Figure 3.

More particularly referring now to the drawings, a motor 1 is mounted in the pit 2 and is adapted to drive shaft 3 through a drive chain 4 or any suitable manner. Positioned within the pit 2 is a track 5 which extends substantially the entire length of the pit. Track 5 is supported by a plurality of screw jacks 6. The shaft 3 carries a plurality of gears 7 meshing with gears 8 of the screw jack. As shaft 3 is rotated in one direction, or another, the screw 9 of the screw jack will be actuated through gears 7 and 8, worm 10 and worm wheel 11, as can be readily seen by reference to Figures 3 and 4. The track 5 is guided by a plurality of guides 12 positioned along the pit and adapted to cooperate with coacting guides 13, carried by the track. Section supporting carriages 14 are adapted to slide along the track 5 as can be seen in Figure 4. Clamping carriages 15 and 16 are also adapted to slide along the track and are shown in Figures 1, 2, 3, and 4. Clamping carriages 15 and 16 carry rollers 17 mounted upon a slidable portion 18 as can be seen in Figure 4. Screw jack means 19 are provided upon the carriages for moving the movable portions 18 for exerting pressure on the rollers. The carriages are adapted to be clamped in position upon the track by means of clamps 20 so that the roller thrust is taken up by the tracks. The pit 2 is provided with wings in which are positioned shafts 21 and 22 which extend longitudinally substantially the length of the pit. In the various figures the work is represented by the reference numeral 23. The shafts 21 and 22 are rotated by motors 24 and 25 positioned at one end of the pit as shown in Figure 1. The arrangement is such that the motor 25 is adapted to rotate the shafts through the gearing shown in Figure 6 at a low or welding speed. The motor 24 is adapted to rotate the shafts at a high speed to turn the work into position for spot welding. The motors are controlled from the welding position so that the operator may control the work at all times. The shafts 21 and 22 carry a series of rollers 26 upon which the work rests when the track is lowered as shown in Figure 3. It is to be understood that the shafts 21 and 22 are interconnected as shown in Figure 6, so that the shafts will rotate at the same speed.

In Figure 6 the gear wheels 27 and 28 are of the same size and are driven from two spur wheels 29 and 30, of exactly the same size. The high speed drive motor 24 drives wheel 31 through a plurality of gears to give a high speed drive. The welding motor 25 drives the wheel 31 directly. A system of solenoids to shift the gears so that the low speed motor is unclutched when the high speed motor is operating is provided. Inasmuch as this gear shifting arrangement forms no part of the present invention, the details have been omitted from the drawings.

Mounted on one side of the pit 2 is a pedestal 32 which supports an arm 33 which is hinged to the pedestal at 34. Hinged to the arm 33 is a second arm 35 which carries the welding rod feeding mechanism. The arrangement is such that the feeding mechanism may be swung into the inside of the work as shown in Figure 4. The rod feeding mechanism comprises a wheel 36 upon which the welding rod is swung. The welding rod 37 is fed by a motor 38 and a feeding mechanism 39. The details of the feeding mechanism form no part of the present invention and are, therefore, not shown and described in detail. The feeding mechanism 39 is supported from arm 35 by a rack 40 which is actuated by a pinion 41 to adjust the vertical position of the welding rod 37 by means of hand wheel 42. The inherent elasticity of the welding rod 37 will hold it against the seam 43 to be welded with sufficient force. It is to be understood that, while I have shown an arrangement which supports the welding mechanism internally of the tank, the pedestal may be increased in height and this mechanism supported above the work to be welded when an inside clamp, which will be more fully described hereinafter, is used.

To support the work laterally, rollers 44 are provided on each side of the pit. These rollers are supported by racks 45 adapted to be moved in and out of a pivoted socket 46 by pinions 47. The sockets 46 may be adjusted through hand wheels 48 and levers 49 to accommodate work of various diameters. Mounted on one side of the pit on track 50 are arms 51 adapted to be clamped at various positions along the track by clamping screws 52. The arms 51 are bored for the reception of screws 53 adapted to exert pressure upon rollers 54 to urge the work into welding position.

When the work is urged to welding position, a circular clamp 55 is placed adjacent the seam to be welded. This clamp forms the subject matter of my copending application, Serial No. 538,769, filed May 20, 1931. A modification of this clamp is shown in Figures 7, 8, and 9, in which a form is shown for use in making an outside weld wherein the clamp is positioned internally of the work. When this form of clamp is used, it is to be understood that it will be suitably supported in a manner similar to the rod feeding mechanism. The clamp consists of a fixed circular ring having mounted thereon a plurality of movable shoes. The movable shoes are moved inwardly by means of compressed air which is supplied through compressed air line 56. The individual shoes are forced into clamping position with a uniform pressure throughout the entire periphery. A backing strip 57 of a metal having a high melting point is provided against which the fused metal from the welding rod flows by gravity and enables a seam having a smooth finish to be obtained. The welding clamp is supported by the work and is guided by a pair of guide pulleys 58. The guide pulleys 58 are supported by a lever 59, which may be positioned at varying positions by means of a slotted support 60 to accommodate for clamping rings of various sizes. A clamping ring of one size may be used for work of different diameters within certain limits determined by the amplitude of the movement of the clamping ring shoes 61. In general, however, a separate clamping ring must be used for work of different diameters. A series of graduated clamping rings are kept in stock.

A welding pit of my invention is suitable for handling work of various diameters between certain limits. It is contemplated that several pits may be provided in a plant to accommodate work of widely different dimensions.

In operation, a series of rings which form sections of a finished tank are made in the customary manner and provided with supporting spiders. The rings are then placed upon the carriages which are carried by the track. The carriages are then rolled along the track to the welding point and clamped into welding position by means of the carriage clamps, the track clamps and the circular clamp. After the work has been clamped, the track is lowered and the work is allowed to rest on the work rotating pulleys 26. The operator then spot welds the seam at a plurality of places using the high speed motor to rotate the work. After the work has been spot welded, the welding rod is carefully placed in position over the seam and the welding rotating motor is operated. The arrangement is such that the rod feeding mechanism motor and the work rotating motor are in series so that a uniform feed is obtained for a given speed of rotation. Controls are provided at the welding position to control the speed of the weld. The entire periphery is then welded at a uniform speed, producing a smooth uniform ductile weld without danger of burning the metal. After the seam has been completed, the track is again raised and the work allowed to rest upon the carriages 14. The clamps are loosened and the work is slid longitudinally toward the rear of the pit. The welding arm is rotated clear of the pit and another section is placed upon and carried on the track. This section is abutted against the portion of the work already completed and clamped into welding position. The welding arm is then swung over the new seam which is spot welded as before. The process is then repeated. As many sections as are necessary are welded until the proper length of tank is reached.

It is to be understood that, after the weld is completed the supporting spider is removed by cutting it up with a cutting torch or in any suitable manner. When the desired length has been reached, the tank header is placed against the open section and clamped into position. This header may be welded with an outside weld. It is to be understood that the pedestal 32 which supports the welding arm may be made adjustable so that the same arm may be used for both the outside and the inside weld. If desired, a man may enter the tank and weld the header and the last section by means of an inside weld thus insuring a smooth exterior surface to the tank.

It will be seen that I have accomplished the object of my invention. I am enabled to produce a tank by means of an automatic welding device which will weld at several times the speed of hand welding. I have provided an apparatus which will clamp the work into welding position and permit the work to be rotated while thus clamped.

I am enabled to handle the sections which comprise the tank in an expeditious manner. The tanks made in accordance with my process have a smooth finished appearance and when the tank has been red leaded and painted, it will have almost the appearance of a homogeneous tank, unmarked by unsightly weld seams. The weld, being made by an automatic process, will have a smoothness which is impossible to attain by hand welding.

It will be understood that certain features, sub-combinations and operations are of utility and may be employed without reference to other features and sub-combinations. This is contemplated by and is within the scope of my claims. It is further obvious that various changes may be made in details within the scope of my claims without departing from the spirit of my invention. It is, therefore, to be understood, that my invention is not to be limited to the specific details shown and described.

Having thus described my invention, what I claim is:

1. A welding apparatus including a track, means for raising and lowering said track, carriages positioned on said track and adapted to support work to be welded, a pair of rotatable shafts positioned below said track, rollers adapted to be rotated with said shafts positioned at spaced points thereon, means for rotating said shafts, whereby when said track is lowered the work to be welded will be supported by said rollers and rotated thereby, and means for welding the work being rotated.

2. A welding apparatus including a track, means for raising and lowering said track, carriages positioned on said track and adapted to support work to be welded, a pair of rotatable shafts positioned below said track, rollers adapted to be rotated with said shafts positioned thereon at spaced points, means for rotating said shafts, whereby when said track is lowered the work to be welded will be supported by said rollers and rotated thereby, means to clamp the work in welding position, said means permitting the rotation of the work, and means for welding the work being rotated.

3. A welding apparatus including a track, means for raising and lowering said track, carriages positioned on said track and adapted to support work to be welded, a pair of rotatable shafts positioned below said track, rollers adapted to be rotated with said shafts positioned at spaced points thereon, means for rotating said shafts, whereby when said track is lowered the work to be welded will be supported by said rollers and rotated thereby, and means for welding the work being rotated, comprising a pedestal, a movable arm supported thereby, and an automatic welding rod feeding device carried by said arm.

4. In a welding apparatus, the combination comprising means for longitudinally movably supporting the work to be welded, said means being adapted to move the work into welding position, means for clamping the work in welding position, means for lowering said supporting means, rotatable means adapted to support the work when said longitudinal movable supporting means is lowered, means to rotate said rotatable means to rotate said work, an adjustably supported welding means adapted to be fixedly positioned in welding position to weld while the work is being rotated.

VICTOR C. NORQUIST.